United States Patent
Fan et al.

(10) Patent No.: US 9,754,178 B2
(45) Date of Patent: Sep. 5, 2017

(54) LONG-TERM STATIC OBJECT DETECTION

(71) Applicant: INTERNATIONAL BUSINESS MACHINES CORPORATION, Armonk, NY (US)

(72) Inventors: Quanfu Fan, Somerville, MA (US); Zuoxuan Lu, Yorktown Heights, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 14/830,273

(22) Filed: Aug. 19, 2015

(65) Prior Publication Data

US 2016/0063344 A1  Mar. 3, 2016

Related U.S. Application Data

(60) Provisional application No. 62/042,382, filed on Aug. 27, 2014.

(51) Int. Cl.
  *G06K 9/00* (2006.01)
  *G06K 9/46* (2006.01)
  *G06T 7/246* (2017.01)

(52) U.S. Cl.
  CPC ....... *G06K 9/4604* (2013.01); *G06K 9/00771* (2013.01); *G06T 7/246* (2017.01); *G06K 2209/23* (2013.01); *G06T 2207/30236* (2013.01)

(58) Field of Classification Search
  CPC .................................................. G06K 9/00771
  See application file for complete search history.

(56) References Cited

U.S. PATENT DOCUMENTS

| | | |
|---|---|---|
| 6,445,832 B1 | 9/2002 | Lee et al. |
| 6,731,805 B2 | 5/2004 | Brodsky et al. |
| 6,873,912 B2 | 3/2005 | Shimomura |
| 7,106,885 B2 | 9/2006 | Osterweil et al. |
| 7,813,528 B2 | 10/2010 | Porikli et al. |
| 2005/0036658 A1 | 2/2005 | Gibbins et al. |
| 2005/0073585 A1 | 4/2005 | Ettinger et al. |
| 2007/0035562 A1* | 2/2007 | Azuma .................. G03B 13/28 345/633 |

(Continued)

OTHER PUBLICATIONS

Albiol, et al. "Detection of Parked Vehicles Using Spatiotemporal Maps". IEEE Transactions On Intelligent Transportation Systems. vol. 12, No. 4. Dec. 2011. pp. 1277-1291.

(Continued)

*Primary Examiner* — Oneal R Mistry
(74) *Attorney, Agent, or Firm* — William H. Hartwell

(57) ABSTRACT

Software for static object detection that performs the following operations: (i) detecting an object that is present in at least one image of a set of images, wherein the set of images correspond to a time period; (ii) identifying a set of corner points for the detected object; (iii) tracking the object's presence in the set of images over the time period, wherein the object's presence is determined by matching the set of images to a template generated based on the identified corner points; and (iv) identifying the object as a static object when an amount of time corresponding to the object's presence in the set of images is greater than a predefined threshold.

20 Claims, 6 Drawing Sheets

(56) References Cited

U.S. PATENT DOCUMENTS

| | | | |
|---|---|---|---|
| 2007/0071289 A1* | 3/2007 | Takeguchi | G06K 9/00281 |
| | | | 382/118 |
| 2007/0201746 A1 | 8/2007 | Kim | |
| 2009/0185715 A1* | 7/2009 | Hofhauser | G06K 9/6206 |
| | | | 382/103 |
| 2009/0238462 A1 | 9/2009 | Feris et al. | |
| 2013/0243252 A1* | 9/2013 | Xu | H04N 7/002 |
| | | | 382/103 |
| 2015/0172626 A1* | 6/2015 | Martini | G06T 7/0065 |
| | | | 348/50 |
| 2015/0310624 A1* | 10/2015 | Bulan | G06T 7/2053 |
| | | | 382/103 |

OTHER PUBLICATIONS

Bayona et al., "Comparative evaluation of stationary foreground object detection algorithms based on background subtraction techniques", Advanced Video and Signal Based Surveillance, © 2009 IEEE, pp. 25-30.

Bevilacqua et al., "Real Time Detection of Stopped Vehicles in Traffic Scenes", Advanced Video and Signal Based Surveillance, © 2007 IEEE, pp. 266-270, <http://ieeexplore.ieee.org/xpls/abs_all.jsp?arnumber=4425321>.

Fan et al. "Long-term Object Tracking for Parked Vehicle Detection", Grace Period Disclosure. Aug. 26, 2015. 11th IEEE International Conference on Advanced Video and Signal Based Surveillance (AVSS), Aug. 26-29. Copyright 2014 IEEE. pp. 223-229.

Fan et al., "Modeling of Temporarily Static Objects for Robust Abandoned Object Detection in Urban Surveillance", 8th IEEE International Conference on Advanced Video and Signal-Based Surveillance, © 2011 IEEE, pp. 36-41.

Fan et al., "Robust Foreground and Abandonment Analysis For Large-scale Abandoned Object Detection in Complex Surveillance Videos", IEEE Ninth International Conference on Advanced Video and Signal-Based Surveillance, © 2012 IEEE, pp. 58-63.

Guler et al., "Stationary Objects in Multiple Object Tracking", Advanced Video and Signal Based Surveillance, © 2007 IEEE, pp. 248-253, <http://ieeexplore.ieee.org/xpls/abs_all.jsp?arnumber=4425318>.

Hassan et al., "Real-Time Occlusion Tolerant Detection of Illegally Parked Vehicles", International Journal of Control, Automation, and Systems, vol. 10, Issue 5, Oct. 2012, © ICROS, KIEE and Springer 2012, pp. 972-981, <http://rd.springer.com/article/10.1007/s12555-012-0514-2>.

Kwak et al., "Abandoned luggage detection using a finite state automaton in surveillance video", Optical Engineering, vol. 40, Issue 2, Published Mar. 2, 2010, © 2010 Society of Photo-Optical Instrumentation Engineers, 10 pages, <http://opticalengineering.spiedigitallibrary.org/article.aspx?articleid=1096279#ConclusionsandFutureWork>.

Lee, et al. "Real-Time Illegal Parking Detection in Outdoor Environments Using 1-D Transformation". IEEE Transactions On Circuits And Systems For Video Technology. vol. 19, No. 7. Jul. 2009. pp. 1014-1024.

Mitra et al., "Tracking illegally parked vehicles using correlation of multi-scale difference of Gaussian filtered patches", Proc. SPIE, vol. 8055, Optical Pattern Recognition XXII, 805503, Apr. 26, 2011, © 2011 Copyright Society of Photo-Optical Instrumentation Engineers, 9 pages, <http://spie.org/Publications/Proceedings/Paper/10.1117/12.883821>.

Rosten et al., "Faster and Better: A Machine Learning Approach to Corner Detection", IEEE Transactions on Pattern Analysis and Machine Intelligence, vol. 32, No. 1, Jan. 2010, pp. 105-119.

Siemens AG et al. "A Boundary Value Distance based on Hausdorff Distance as a inter and intra Class Classifier of Rigid Objects". An IP.com Prior Art Database Technical Disclosure. Original Publication Date: May 25, 2006. IP.com No. IPCOM000135708D. IP.com Electronic Publication: Apr. 21, 2006. Copyright: Seimens AG 2006.

Tan et al., "Enhanced Local Texture Feature Sets for Face Recognition Under Difficult Lighting Conditions", in: S.K. Zhou et al. (Eds.): AMFG 2007, LNCS 4778, © Springer-Verlag Berlin Heidelberg, pp. 168-182.

Tian, et al. "Real-Time Detection of Abandoned and Removed Objects in Complex Environments". Author manuscript, published in "N/P". inria-00325775, Version 1. Sep. 30, 2008.

* cited by examiner

```
Algorithm 1: InsertVehicle(T, O_s^t, L_p)
  Input: T: a tree with a list of static objects, each of
         which has a mask and template; O_s^t: a new
         detected static object; L_p: a set of corner
         points detected on O_s^t
  Output: an updated tree T
1  bAdded ← true;
2  tn ← new TreeNode(O_s^t, L_p);
3  V' ← O_s^t; L_p' ← L_p;
4  while T.nextChild() do
5  |   tc ← T.getChild(); O_s^{t'} ← tc.mask;
6  |   if O_s^{t'} ⊂ O_s^t then
7  |   |   V' ← V' \ O_s^{t'};
8  |   |   L_p' ← {p_i | p_i ∈ L_p', p_i ∈ V'};
9  |   |   tn.AddChild(tc);
10 |   else
11 |   |   bAdded ← false;
12 |   |   break;
13 if bAdded then
14 |   if V' ≠ O_s^t then
15 |   |   tn.AddChild(new TreeNode(V', L_p'));
16 |   T.AddChild(tn);
17 return T;
```

FIG. 7A

```
Algorithm 2: DeleteVehicle(T, tc)
  Input: T: a tree with a list of static objects, each of
         which has a mask and template; tc: a vehicle
         node to be deleted
  Output: an updated tree T
1  tp ← tc.getParent();
2  if tp is not root then
3  |   tp.mask ← tp.mask \ tc.mask;
4  |   update tp.template;
5  delete tc from T;
6  if tp is not root && tp.hasChild() == false then
7  |   delete tp from T;
8  return T;
```

FIG. 7B

LONG-TERM STATIC OBJECT DETECTION

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:
(i) FAN et al. "Long-term Object Tracking For Parked Vehicle Detection", Aug. 26, 2015. 11th IEEE International Conference on Advanced Video and Signal Based Surveillance (AVSS), August 26-29. Pages 223-229.

BACKGROUND

The present invention relates generally to the field of object detection, and more particularly to long-term detection and tracking of static objects.

Computer vision—the field of using computers for vision perception purposes—is known. Computer vision includes methods for acquiring, processing, analyzing, and understanding images in order to produce numerical or symbolic information. Visual object detection (or "object detection") is a known sub-domain of computer vision that involves finding and identifying objects in digital images and/or videos, where static object detection involves finding and identifying objects that do not move (i.e. remain static) for a period of time, such as parked vehicles.

Template matching is a known technique for finding portions of an image which match a template image. Generally speaking, template matching can be used to match objects under a variety of conditions, such as varying perspectives or illuminations. Keypoints are local points within images that define what is interesting within those images.

SUMMARY

According to an aspect of the present invention, there is a method, computer program product and/or system for static object detection that performs the following operations (not necessarily in the following order): (i) detecting an object that is present in at least one image of a set of images, wherein the set of images correspond to a time period; (ii) identifying a set of corner points for the detected object; (iii) tracking the object's presence in the set of images over the time period, wherein the object's presence is determined by matching the set of images to a template generated based on the identified corner points; and (iv) identifying the object as a static object when an amount of time corresponding to the object's presence in the set of images is greater than a predefined threshold. At least the tracking is performed by computer software running on computer hardware.

BRIEF DESCRIPTION OF THE DRAWINGS

FIG. 7A is a diagram showing an algorithm for inserting a vehicle into a tree-based representation of static objects, according to embodiments of the present invention;

FIG. 7B is a diagram showing an algorithm for detecting a vehicle from a tree-based representation of static objects, according to embodiments of the present invention;

DETAILED DESCRIPTION

Figure 1:
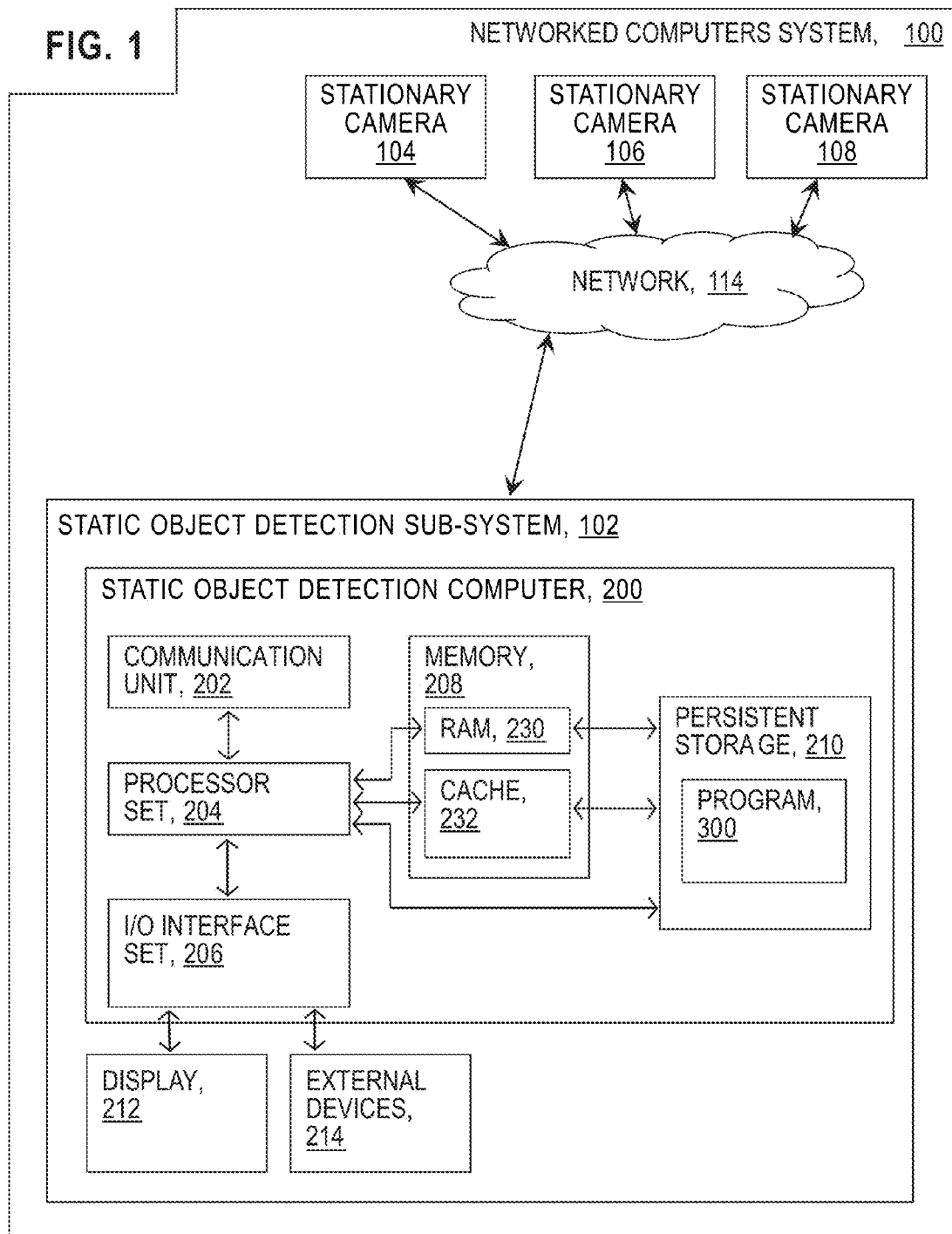
FIG. 1 is a block diagram view of a first embodiment of a system according to the present invention.

Typical issues that arise in object tracking in a surveillance environment include frequent occlusions, lighting changes and imaging quality. Embodiments of the present invention perform enhanced long-term object tracking by using template matching to match corner points of detected objects. In some embodiments, the corner-based templates are adaptively updated to account for scene changes (e.g. changes in lighting) over time. Further, in some embodiments, machine-logic based tree representations are used to represent occluded objects and model the insertion and removal of objects from a scene over time. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: static object detection sub-system 102; stationary cameras 104, 106, and 108; communication network 114; static object detection computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with static object detection computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
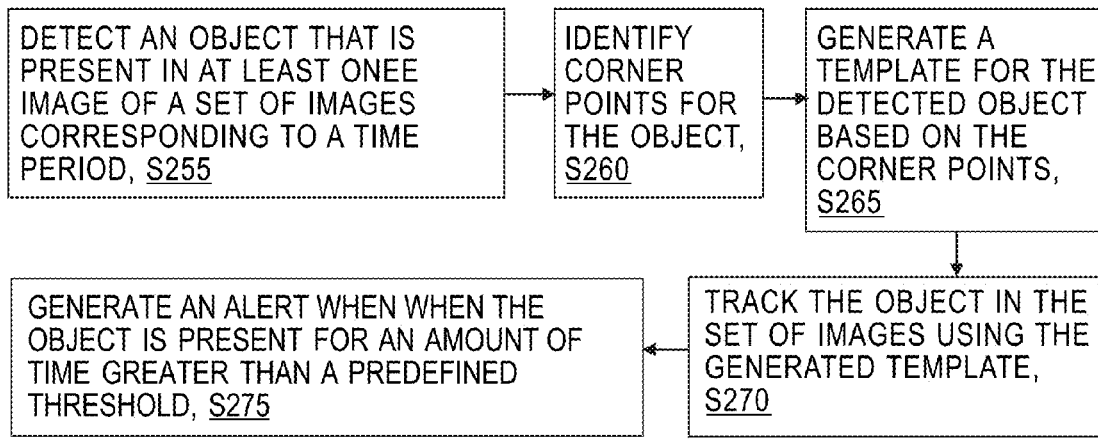
FIG. 2 is a flowchart showing a first embodiment method performed, at least in part, by the first embodiment system.
Figure 3:
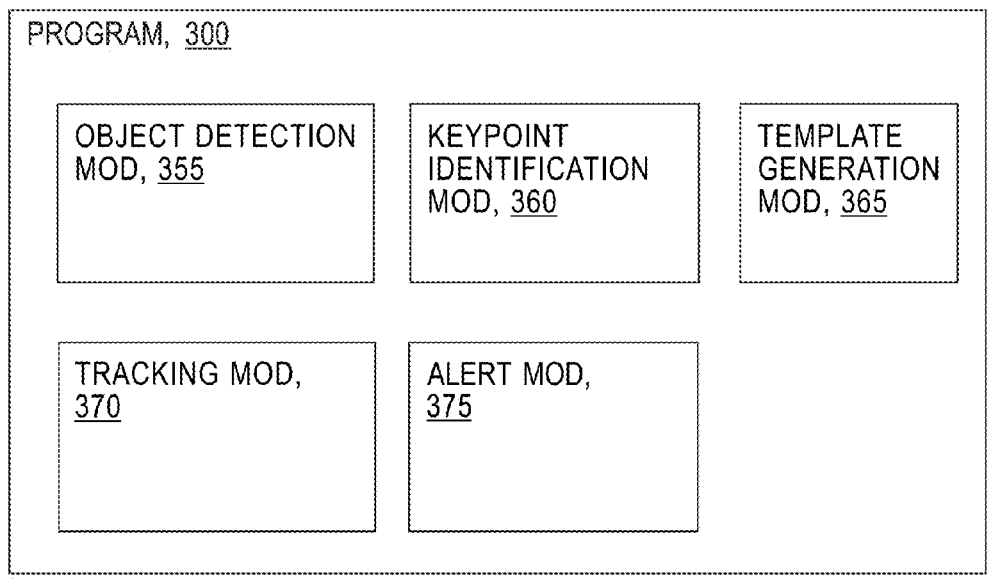
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

As will be made apparent throughout this subsection, a purpose of the method depicted in flowchart 250 is to detect static (i.e., non-moving) objects from a set of images (such as a video feed). While known object detection methods (such as methods for abandoned object detection) may be adapted to detect objects that are static for relatively short periods of time (that is, they require a quick response, and thus short-term tracking is sufficient), the method of the present embodiment is generally adapted to do the opposite—that is, detect objects that have been static for a relatively long period of time. This can be helpful in situations such as parked vehicle detection, where a user may desire to determine if a vehicle has been parked for longer than a permitted time period. However, despite the general applicability to the tracking of parked vehicles, it should be noted that embodiments of the present invention may be adapted for a wide variety of known (or yet to be known) purposes, including any purpose that involves tracking static (or relatively static) objects for a period of time.

Processing begins at operation S255, where object detection module ("mod") 305 detects an object that is present in at least one image of a set of images, where the set of images corresponds to a time period. In some embodiments, the images of the set are frames from a video feed, and the corresponding time period is the time period captured by the video feed (for example, 2:00 PM to 4:00 PM on a Tuesday). However, this is not meant to be limiting, and the set of images may be any set of images for which it is desired to detect static objects. For example, in one embodiment, the set of images includes a series of photographs captured from a single position over a period of time. Furthermore, although in many embodiments it may be desired for the images to depict scenes (i.e. image content) viewed from the same general perspective (i.e. captured from a single position, such as a static camera), in some embodiments the images may depict scenes from varying perspectives, angles, and/or views. In the present embodiment, for example, the images depict scenes of parked vehicles, where the images are surveillance output (see Definitions sub-section) received from stationary cameras 104, 106, and 108 (see FIG. 1).

Generally speaking, object detection is the process of finding and/or identifying an object in a digital image and/or video (see the Definitions sub-section of this Detailed Description). In many cases, the objects detected by object detection mod 305 fall within one or more classes, such as humans, buildings, or vehicles, where object detection mod 305 is particularly adapted to detect objects that fall within one or more of those classes. For example, in the present embodiment, object detection mod 305 is adapted to detect vehicles (particularly, parked vehicles). In performing the object detection of operation S255, object detection mod 305 may utilize one or more of a wide variety of known (or yet to be known) methods (for example, background modeling and subtraction). For a further discussion of some of these methods, see the Further Comments and/or Embodiments sub-section of this Detailed Description.

Processing proceeds to operation S260, where keypoint identification mod 360 identifies keypoints (specifically, corner points) for the object. Generally speaking, a keypoint is a portion of an object within an image (for example, a local point within an image that defines what is interesting in the image) that is used for the template matching process, where template matching is a process for finding portions of an image that match a template image (to be discussed in further detail, below). Some examples of known keypoint identification methods include, but are not limited to, speeded up robust features (SURF) and scale-invariant feature transform (SIFT). A corner point is a keypoint that is located at or near the corner of an object. Keypoint identification mod 360 may use any known (or yet to be known) method for identifying corner points for the object, including, for example, a FAST corner detection technique (see the Further Comments and/or Embodiments sub-section). Furthermore, although the present example embodiment identifies corner points, other embodiments may identify other types of keypoints that are helpful for template matching (such as SIFT and SURF). For an example of detected corner points, see FIG. 4.

Processing proceeds to operation S265, where template generation mod 365 generates a template for the detected object based on the corner points. That is, once corner points are identified, they are used to generate a template that will be used for tracking the object throughout the remaining images of the set. Many known (or yet to be known) methods for generating templates may be used, some of which are discussed below in the Further Comments and/or Embodiments sub-section of this Detailed Description. In the present example embodiment, the template for an object is simply a set of corner points detected on the object. In this particular example, each corner point is associated with a location, a feature descriptor and a weight indicating the stability of the point (i.e. how repetitive the point is across images).

In certain embodiments, template generation mod 365 continuously updates the generated template during the tracking process (see operation S270, discussed below). In these embodiments, keypoint identification mod 360 may detect additional corner points during tracking (for example, from images other than the image used to originally detect the object in operation S255), and template generation mod 365 may update the template according to those additional corner points. By adaptively updating templates in real-time, these embodiments improve object detection sub-system 102's ability to accurately track objects in a variety of real-life lighting and illumination conditions. For a detailed discussion of the template updating process, see the Further Comments and/or Embodiments sub-section of this Detailed Description.

In certain embodiments, template generation mod 365 may also assign weights to the corner points used in the generated template. For example, in some embodiments, template generation mod 365 determines an amount of stability for each of the identified corner points, where the amount of stability generally refers to how constantly a corner point appears across images. The amount of stability may then be used to provide weights to each of the corner points, where the weights can then be used to further enhance the template matching process. For additional discussion of corner point weights, see the Further Comments and/or Embodiments sub-section of this Detailed Description (for example, the discussion surrounding Equation 2).

Processing proceeds to operation S270, where tracking mod 370 tracks the object in the set of images using the generated template. Stated another way, tracking mod 370 tracks the object's presence throughout the set of images, where the object's presence is determined by matching the set of images to the generated template. In the present embodiment, tracking mod 370 performs template matching (using the generated template) on each image of the set of images in order to determine whether the detected object is present in the respective image. Upon completion of the tracking, tracking mod 370 stores information relating to the detected object, including, for example: (i) the number of images the object appears in; (ii) the number of consecutive images the object appears in; (iii) whether there are any gaps in series of images including the detected object; and/or (iv) information relating to an amount of likelihood or certainty of each respective detection.

Figure 5A:
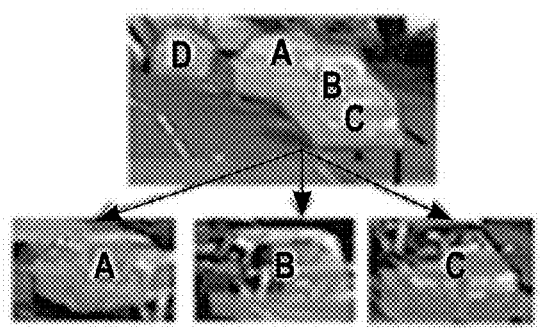
FIG. 5A is a tree diagram showing information that is helpful in understanding occlusion representations according to embodiments of the present invention.
Figure 5B:
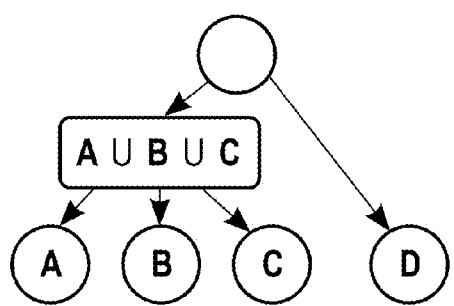
FIG. 5B is a tree diagram showing information that is helpful in understanding occlusion representations according to embodiments of the present invention.

In some cases, it may be difficult for tracking mod 370 to accurately track an object in an image due to occlusions. That is, in some cases, an object being tracked may be occluded by another object, such as a second object (or set of objects) that are separately being tracked by tracking mod 370. In these situations, objects of the present invention may utilize a tree-based representation to assist in properly detecting objects within the image. This representation, which is discussed extensively in the Further Comments and/or Embodiments sub-section of this Detailed Description (and an example of which is shown in FIG. 5B), can be used to effectively track a plurality of separate objects within the same set of images. This can be particularly helpful in the context of parked vehicle tracking, where closely parked vehicles may regularly occlude one another form the perspective of a stationary camera.

In some situations, tracking mod 370 may utilize background information during the template matching process to account for lighting changes over time. That is, in some cases, the background of an image (determined, for example, using background subtraction) may be matched against the generated template. If the image's background matches the template, then the likelihood that the foreground of that same image is an actual template match decreases. This can occur, for example, when lighting changes have caused a false-positive match for a portion of the foreground region of the image. When tracking mod 370 detects such an abnormality, it can choose to ignore the match and, in some case, use that information to adjust the respective weights of the respective corner points in the template. For additional discussion of utilizing background information during template matching, see the Further Comments and/or Embodiments sub-section of this Detailed Description (for example, the discussion surrounding Equation 3).

Processing proceeds to operation S275, where alert mod 375 generates an alert when the object is present in the set of images for an amount of time greater than a predefined threshold. Using the information obtained from the tracking of operation S270 (for example, the number of consecutive images that the object appears in), mod 375 can determine an amount of time for which the object remains in the same place. If the amount of time is greater than a threshold, then the object is identified as being static. The threshold can vary depending on the situation. For example, in one embodiment, where sub-system 102 detects parked vehicles that have overstayed a two hour parking period, the threshold is two hours. In another embodiment, where sub-system 102 is monitoring a no-parking zone, the threshold may be much shorter (for example, five minutes). However, this is not meant to be limiting, and the threshold may be any amount of time that sub-system 102 may track to meet its desired purpose.

The alert generated by mod 375 may vary in its content, delivery method, and intended recipient, based on the task that sub-system 102 has been adapted for. For example, in the present example embodiment, where the purpose of sub-system 102 is to track improperly parked vehicles on a city street, the alert is sent to a parking enforcement officer for possible ticketing of the parked vehicle. In another embodiment, where the purpose of sub-system 102 is to monitor parked vehicles for the purpose of calculating a parking fee (for example, in a parking garage), the alert may be sent to an automated computer system that generates a parking bill for the vehicle's operator.

III. FURTHER COMMENTS AND/OR EMBODIMENTS

Some embodiments of the present invention recognize the following facts, potential problems and/or potential areas for improvement with respect to the current state of the art: (i) existing object detection methods fail to adequately adapt templates to account for illumination changes; (ii) existing object detection methods fail to adequately identify closely parked vehicles (or "static occlusions"); and (iii) existing approaches are adapted for quick or short-term object detection, and are therefore not suitable for long-term object (for example, vehicle) detection.

Some embodiments of the present invention provide a system and method for parked vehicle detection (and, in many cases, long-term vehicle tracking) under challenging realistic environments, including: (i) an efficient technique for tracking parked vehicles based on fast-computed corner points and adaptive template matching; (ii) robust methods for handling static occlusions from vehicles parking nearby and moving occlusions from moving foreground objects; and (iii) a technique of combing long-term background modeling and template matching to deal with "ghost" issues (that is, issues arising from falsely detected foreground regions). In some embodiments, a template is made adaptive over time to accommodate varied illuminations. In some embodiments, a tree representation is used for managing multiple vehicles parked closed to each other, regardless of the order of their arrivals and departures.

Some embodiments of the present invention include a robust approach for detecting parked vehicles in real time, focusing on tracking vehicles over a long period of time under challenging conditions (such as lighting/illumination changes and occlusions). In these embodiments, vehicle tracking is performed by template matching based on quickly computed corner points. The template model is made self-adaptive over time to accommodate lighting changes. Some embodiments additionally provide an effective way to manage and track multiple vehicles when they are parked closely to each other and occlude one another.

Some embodiments of the present invention provide a method including the following operations: (i) detecting a static object; (ii) detecting corner points and creating a template for the object based on the corner points detected; (iii) matching frames to the template and dynamically adapting the template; and (iv) generating an alert when the object is present for an amount of time great than a predefined threshold. In these embodiments, static object detection may be achieved, for example, through background modeling and subtraction (BGS).

Generally speaking, parked vehicle detection (PVD) refers to automatically detecting the overstay of a vehicle at a location using surveillance cameras. PVD information can be used in many different ways, including, for example, in parking lot management (vehicle counting), on-street parking enforcement (illegal overstay), and traffic congestion control (broken-down vehicles on road side).

Certain embodiments of the present invention generate dynamic templates based on keypoints (such as fast corner points) to represent static objects. Image 400 (see FIG. 4) includes an example of a template based on fast corner points, where stable corner points are marked with an X. Vehicle tracking can then be performed by matching each frame to a template using illumination-invariant Local Ternary Pattern (LTP) features. Templates are made self-adaptive over time, in order to handle variations in illumination. Further, for additional robustness, high weights are provided to stable corner points, and background information is leveraged in the template matching process.

Figure 4:
FIG. 4 is a template generated from fast corner points according to an embodiment of the present invention.

Certain embodiments of the present invention address the issue of occlusions due to close parking using a tree-based representation of vehicles. In some of these embodiments, vehicles are separated out individually by segmentation and then organized/managed using a two-level tree. Tree 520 (see FIG. 5A) and tree 540 (see FIG. 5B) are examples of trees according to these embodiments, where trees 520 and 540 correspond to the image 400 (see FIG. 4). As shown in FIGS. 5A and 5B, four vehicles (A, B, C, and D) are detected, where three of the vehicles (A, B, and C) overlap and are therefore grouped together (represented by the union of A, B, and C). Tree 520 depicts images of the overlapped vehicles (A, B, and C), while tree 540 depicts an additional tree structure showing the relationship between the overlapping vehicles (A, B, and C) and vehicle D. By representing vehicles in this way, embodiments of the present invention can address arbitrary arrivals and departures of vehicles flexibly (for example, in the case of close parking). This representation also allows for holistic template matching of multiple vehicles without the necessity of matching each of the templates individually.

Some embodiments of the present invention detect static objects utilizing a method based on background modeling and subtraction (BGS). This method integrates into background modeling a finite state machine (FSM) that tracks temporarily static objects such as stopped cars and still pedestrians. The object-level information (such as moving or static object) provided by the FSM enables a region-level background update, which greatly improves background modeling in realistic monitoring environments. This FSM-based approach also provides benefits in the handling of ghost images.

Referring still to BGS-based methods, some methods (or models) may maintain static objects in the foreground of an image up to an amount of time pre-specified by a user. As a result, a background under occlusion is protected from being instantly blended with static pixels (which is a common occurrence in other—i.e. known—methods). This benefits long-term image trackers of the present invention, which leverage background information to address spuriously detected static regions due to illumination changes. Furthermore, in some embodiments, the background model used by a BGS-based method is a Gaussian model with three distributions representing background pixels, static pixels, and moving pixels, respectively. Specifically, in these embodiments, the second distribution is dedicated exclusively to modeling static pixels. When the weight of a pixel on the second distribution exceeds a certain threshold, the pixel is classified static. A static region (or object) is detected if the majority of pixels in the region become static.

Once a vehicle is identified as static, some embodiments of the present invention track the vehicle to determine whether the vehicle remains static over a period of time. However, it can be difficult to properly track vehicles (or any objects) when illumination changes over time. Known approaches for tracking illumination changes apply either cross-correlation-based matching or edge-based matching. However, the templates used in those approaches remain unchanged during the tracking process. Due to lack of adaptability, those techniques can face difficulties in long-term tracking in demanding realistic environments. Some embodiments of the present invention overcome these difficulties by utilizing an adaptive template model based on local keypoints.

Template matching can be based on keypoints such as regions, edges, or specific points. Some embodiments of the present invention build template models using corner points as keypoints. In some embodiments, a FAST corner detection technique is used, determining the "cornerness" of a pixel by checking whether it is brighter (or darker) than a set of contiguous neighbor pixels. Corner points may be matched using local ternary pattern (LTP) features extracted at each point. LTP is an extension of local binary patterns (LBP), where LTP improves resistance to noise by thresholding a pixel into three values (for example, $\{-1, 0, 1\}$) instead of two values (for example, $\{0, 1\}$). Both LTP and FAST corner detection can result in extremely fast computation speeds. In one embodiment, LTPs are encoding using eight neighbor pixels, for example.

In some embodiments, when static objects under fixed cameras are being compared, a corner point $p_i$ at location $x_i$ can be matched to a point $p_j$ at location $x_j$ if and only if Equation 1A and Equation 1B (below) are both true, where "$\|.\|$" denotes the Euclidean distance of two points and "$d(.,.)$" is the Hamming distance of two LTP features $f_i$ and $f_j$:

$$\|x_i - x_j\| \leq \epsilon_1 \qquad \text{Equation 1A}$$

$$d(f_i, f_j) \geq \epsilon_2 \qquad \text{Equation 1B}$$

In an embodiment, $\epsilon_1 = 2$ and $\epsilon_2 = 6$, where $\epsilon_1$ is an empirically set threshold that determines if the keypoints are spatially close, and where $\epsilon_2$ is an empirically set threshold that determines if the keypoints are similar in the feature space.

As used herein throughout this sub-section, $O_s^t$ represents a static object (also referred to as a "foreground region" or "mask") being tracked at time t. Template model $\Phi^t$ represents $O_s^t$ where $\Phi^t = \{p_i^t \in O_s^t | i=1, \ldots, n\}$ is a set of corner points detected on the object. Each point $p_i^t$ is associated with a location $x_i^t$, an LTP descripter $f_i^t$ and a weight $w_i^t$, where the weight indicates the stability of the corner point.

In some embodiments, the template model is self-evolving over time (for example, to accommodate for situations where lighting is not consistent). In these embodiments, the model may add newly detected keypoints to and eliminate obsolete keypoints from the template. The stability of a keypoint $p_i^t$ may be measured using the weight $w_i^t$, where the weight may represent, for example, how constantly the point appears over time. In an embodiment, for a keypoint $p_i^t \in \Phi^t$, its weight is computed according to Equation 2, where $\delta_i^t = 1$ if $p_i^t$ is matched and $\delta_i^t = -1$ otherwise, and where p is a constant learning rate.

$$w_i^t = \min(1.0, w_i^{t-1} \alpha \delta_i^t p) \qquad \text{Equation 2}$$

In some embodiments, p is set to 0.05. The model is dynamically updated by removing all the points with a negative weight and adding to the template new points with an initial weight of 0.0. To keep the model from being corrupted from occlusion, the update is not performed if template matching fails (for example, if it falls below a threshold).

$p_1, p_2, \ldots, p_k$ ($k \leq n$) is a list of the template keypoints that are matched to frame keypoints in certain embodiments of the present invention. The support of a frame to the template (that is, how strongly the frame matches the template) is defined as $C_f = \sum_{i=1}^{k} w_i$. The maximum support to the template can then be expressed as $C_\Phi = \sum_{i=1}^{n} w_i$, which is the ideal case that all template points are successfully matched. In these embodiments, the more stable the points, the more they contribute to the support. $C_b$ is then obtained by matching the background to the template in a similar way. The quality of the template is then evaluated by calculating score S, which is defined in Equation 3.

$$S = 0.5 * \frac{C_f}{C_\Phi} + 0.5 * \max\left(\frac{C_f - C_b}{C_f m}, 0.0\right) \qquad \text{Equation 3}$$

The score calculated by Equation 3 is divided into two parts. The first part $$\left(0.5 * \frac{C_f}{C_\Phi}\right)$$

measures the similarity of a template to the image patch of a frame at the same location. The second part $$\left(0.5 * \max\left(\frac{C_f - C_b}{C_f m}, 0.0\right)\right)$$

indicates the difference between the template and the background. When the background is matched to the template as strongly as the frame (or even more strongly), then the template is more likely to relate to a falsely detected foreground region due to lighting changes. A frame is matched to a template if the matching score computed from Equation 3 is sufficiently high. In many embodiments, the matching threshold is determined empirically. In one particular embodiment, a threshold between 0.6 and 0.7 is used.

When detecting parked vehicles, occlusions may arise from moving objects (moving occlusions) or other vehicles parked nearby (static occlusions). In the field of object detection, the current state of the art lacks solutions for detecting static occlusions when managing and/or tracking parked vehicles that occlude one another.

Close parking situations can occur in many different (and sometimes arbitrary) ways. Referring to FIGS. 4, 5A and 5B, the situation of having three closely parked vehicles (vehicles A, B, and C) could occur from many different combinations of events. In one example, vehicle A arrives first, followed by vehicle B, and followed by vehicle C. In another example, vehicles A and C arrive together, followed by vehicle B. Vehicle departures are subject to the same type of variation. To track (and manage) each vehicle as vehicles arrive and leave, accurate object separation is necessary. In many cases, BGS alone will not provide this required object separation.

Figure 6:
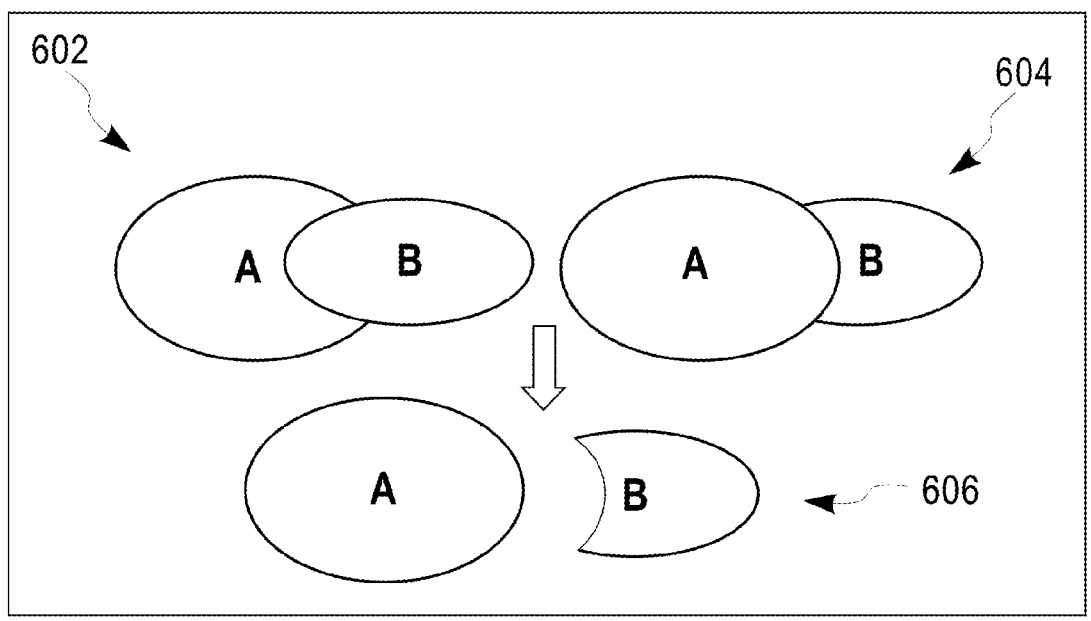
FIG. 6 is a diagram showing information that is helpful in understanding object separation according to embodiments of the present invention.

In certain embodiments, object separation is performed based on the assumption that an occlusion, if existing, always occurs on a new vehicle that joins already existing vehicles. This assumption can significantly simplify the object separation process. For example, $V^t$ represents a new vehicle where $V^t \epsilon O_s^t$ and $O_s^t$ is a newly detected static object. If $O_s^t$ covers any existing static objects, then $V^t$ must be close to some other parked vehicle. Further, if $O_s^n$ (t'<t) is a static object such that $O_s^n \epsilon O_s^t$, then $V^t \approx O_s^t \setminus O_s^n$. Diagram 600 (see FIG. 6) provides an illustration of this. In diagram 600, objects "A" and "B" represent vehicles. Vehicle B is a "new" vehicle, and depending on the camera view, Vehicle B either: (i) occludes Vehicle A, as depicted in combination 602, or (ii) is occluded by Vehicle B, as depicted in combination 604. As explained above, the assumption that an occlusion always occurs on a new vehicle results in combination 606 (which is substantially similar to combination 604), where Vehicle A occludes Vehicle B (and where B is only partially represented, by A∪B\A). In some embodiments, the letter 'A' could represent multiple vehicles (or a "blob" of multiple vehicles), where Vehicle B is a new vehicle that becomes occluded by a plurality of existing vehicles.

It should be noted that although the assumption discussed in the previous paragraph may result in a vehicle only being partially represented, accurate segmentation—though desirable—is not necessary for template matching according to embodiments of the present invention. This is due to the way that embodiments of the present invention represent parked vehicles, which enables holistic matching of multiple vehicles without the need to match each vehicle individually.

As depicted in FIG. 5A and FIG. 5B, many embodiments represent a list of static objects by a tree where a leaf node is either a visually isolated vehicle or a vehicle separated out from others, and where an internal node denotes a union of multiple vehicles that are close to each other. In some of these embodiments, each node is associated with a foreground mask and a keypoint template (as described above). When a new static object $O_s^t$ is detected, the first level nodes in the tree may be traversed, identifying any object $O_s^n \epsilon O_s^t$ and then removing (or "carving") it from $O_s^t$. If $O_s^n$. If $O_s^n$ belongs to a leaf node, it is directly added as a child of $O_s^t$. Otherwise, all the children of $O_s^n$ are transferred to $O_s^t$. At the end, $O_s^t$ is inserted into the tree either as a single leaf node (no children found) or as an internal node with a list of children including the newly separated-out vehicle. Such a representation also makes it easy to handle a vehicle's departure. Whenever a vehicle is detected as leaving, it is removed from the tree and the mask and template of its parent node are updated accordingly. Algorithms 700 (see FIG. 7A) and 720 (see FIG. 7B) are examples of ways to perform the insertion and deletion functions according to these embodiments. Algorithms 700 and 720 are pseudocode examples of ways to insert and delete vehicles according to embodiments of the present invention, referring to variables and terminology used in this sub-section. However, in some embodiments, vehicle insert and/or deletion may occur in other ways not discussed herein.

When a sudden lighting change occurs, a tracked object may get detected again (by BGS) as a second static object. Using the object tracking approach discussed herein, such an object is excluded if it is determined that the object is included by or substantially overlaps with an existing tracked object.

In some embodiments, when multiple vehicles occlude one another, holistic template matching occurs, where multiple vehicles are treated as one for template matching purposes. For example, template matching may be performed on an internal tree node (see, for example, "A∪B∪C" from FIG. 5B), resulting in a matching score. If the matching succeeds, the score is propagated directly to its children. As a result, template matching for a leaf node (that is, an individual vehicle, such as vehicle A from FIG. 5B) is only necessary when matching fails on a parent node. This approach can be advantageous over matching individual vehicles separately, as larger sets of vehicles can potentially provide more keypoints for robust tracking and matching.

Figure 8A:
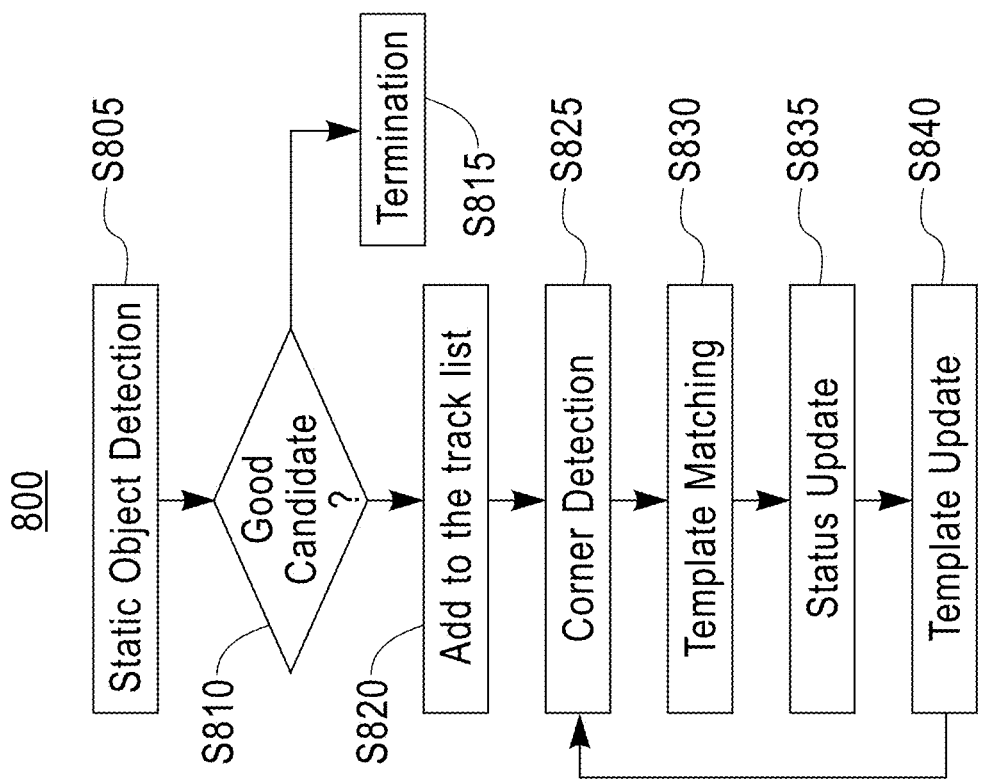
FIG. 8A is a flowchart showing a method performed by an embodiment of the present invention.
Figure 8B:
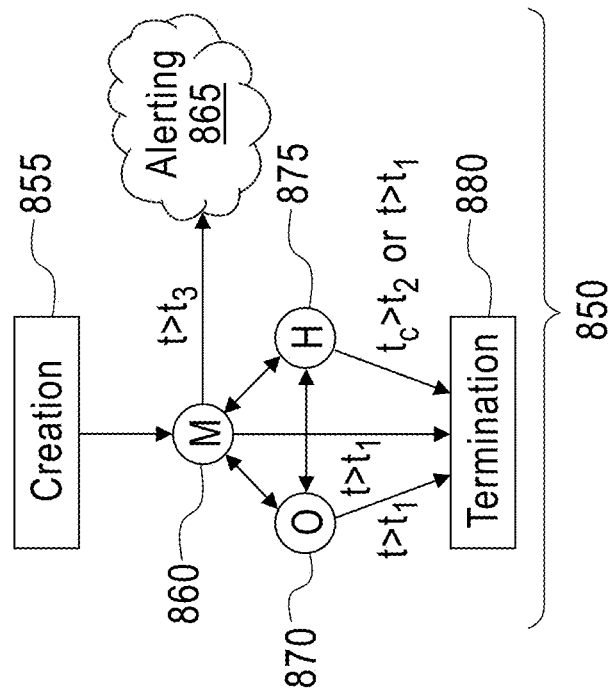
FIG. 8B is a flowchart showing a finite state machine utilized by an embodiment of the present invention.

In certain embodiments, vehicle tracking is primarily based on the keypoint template matching discussed above. Flowchart 800 (see FIG. 8A) depicts a method according to one of these embodiments. Referring to FIG. 8, processing begins with static object detection (S805), followed by a determination (S810) as to whether the object is a good candidate. If the object is not a good candidate, processing terminates (S815), and if the object is a good candidate, the candidate is added to a track list (S820). Processing continues to corner detection (S825), template matching (S830), status update (S835), and template update (S840). Generally speaking, these operations are performed according to methods previously discussed in this sub-section. However, in other embodiments, object detection and candidate "worthiness" may be determined using any known (or yet to be known) method for doing so.

In some embodiments, the lifecycle of one or more nodes in the tree is modeled using a finite state machine (FSM). Diagram 850 (see FIG. 8B) depicts a FSM according to one of these embodiments. In addition to states for creation (855) and termination (88), the FSM also includes states (or "statuses") for "matched" (represented by state M 860), "occluded" (represented by state O 870), and "on-hold" (represented by state H 875). In this embodiment, if template matching fails (for example, due to occlusion), the system checks whether there is a sufficiently larger foreground object (or "blob") covering the static object associated with the corresponding node. If yes, the node is marked as occluded (state 870). If no, the node is marked as on-hold (state 875). Once a node is marked as occluded, the template update is immediately stopped to preserve the saliency of the template until the node is matched again at a later time. On the other hand, if a node is marked as on-hold for a specified period of time (represented by $t_2$ in FIG. 8B), the node is terminated (state 880). If the node remains "alive" past a maximum lifetime (represented by $t_1$ in FIG. 8B)—which indicates how long the system should keep track of the node—the node is terminated (state 880). If a node remains matched for a period of time (represented by $t_3$ in FIG. 8B)—such as the period of time discussed above in relation to operation S275 (see FIG. 2)—an alert (865) is issued. In one example, $t_2$ is set to five seconds while $t_1$ varies with alert time $t_3$ required by the system.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Surveillance output: any video image(s) or series of successive still images collected by a surveillance system; devices that may be used by a surveillance system to collect surveillance output include, but are not limited to: stationary cameras; mobile/moveable cameras; smart (and/or camera) phones; computers (see definition, above); and/or computer-readable storage media, for example.

Object detection: the process of finding and/or identifying an object in a digital image and/or video; examples of types of objects that are detectable via object detection include, but are not limited to: (i) animate objects such as humans (or people), human features (such as faces and/or facial characteristics), animals, and/or vegetation (or plants); (ii) inanimate objects such as buildings, vehicles, devices (including, for example, computers), and/or furniture; and/or (iii) combinations of animate and inanimate objects, such as landscapes, cityscapes, and/or geographic features.

What is claimed is:

1. A method for static object detection, the method comprising:
    detecting an object that is present in at least one image of a set of images, wherein the set of images correspond to a time period;
    identifying a set of corner points for the detected object;
    generating a template based on the identified set of corner points, wherein the template includes a weight assigned to a corner point of the set of corner points;
    tracking the object's presence in the set of images over the time period, wherein the object's presence is determined by matching the set of images to the template;
    determining background information, wherein the background information includes an amount of a match between the template and a background of a first image of the set of images, and wherein the background is determined utilizing background subtraction;
    updating the template based on the background information, wherein updating the template includes adjusting the weight based on the amount of the match between the background and the generated template; and
    identifying the object as a static object when an amount of time corresponding to the object's presence in the set of images is greater than a predefined threshold;
    wherein at least the tracking is performed by computer software running on computer hardware.

2. The method of claim 1, wherein the set of images includes frames from a video.

3. The method of claim 1, further comprising generating an alert indicating that the static object has been detected.

4. The method of claim 1, further comprising:
    identifying additional corner points for the detected object during the tracking; and
    updating the template based, at least in part, on the identified additional corner points.

5. The method of claim 1, further comprising utilizing a tree-based representation to manage detection of the object when the object is occluded.

6. The method of claim 1, further comprising:
    determining an amount of stability for corner points in the set of corner points, wherein the weight assigned to the corner point of the set of corner points is based, at least in part, on the corner point's respective amount of stability.

7. The method of claim 1, wherein the adjusting of the weight includes decreasing the weight when the amount of the match between the template and the background of the first image is greater than or equal to an amount of a match between the template and a frame of the first image, the frame being defined by the identified corner points.

8. The method of claim 1, wherein the first image is matched to the template when the amount of the match between the template and the background of the first image is less than an amount of a match between the template and a frame of the first image, the frame being defined by the identified corner points.

9. The method of claim 8, wherein the first image is matched to the template when a matching score S computed from the following formula is above a predetermined threshold:

$$S = 0.5 * \frac{C_f}{C_\Phi} + 0.5 * \max\left(\frac{C_f - C_b}{C_f}, 0.0\right)$$

where $C_f$ represents the amount of the match between the template and the frame, where $C_\Phi$ represents a maximum amount of match to the template, and where $C_b$ represents the amount of the match between the template and the background.

10. A computer program product for static object detection, the computer program product comprising a computer readable storage medium having stored thereon:
   instructions executable by a device to cause the device to detect an object that is present in at least one image of a set of images, wherein the set of images correspond to a time period;
   instructions executable by the device to cause the device to identify a set of corner points for the detected object;
   instructions executable by the device to cause the device to generate a template based on the identified set of corner points, wherein the template includes a weight assigned to a corner point of the set of corner points;
   instructions executable by the device to cause the device to track the object's presence in the set of images over the time period, wherein the object's presence is determined by matching the set of images to the template;
   instructions executable by the device to cause the device to determine background information, wherein the background information includes an amount of a match between the template and a background of a first image of the set of images, and wherein the background is determined utilizing background subtraction;
   instructions executable by the device to cause the device to update the template based on the background information, wherein updating the template includes adjusting the weight based on the amount of the match between the background and the generated template; and
   instructions executable by the device to cause the device to identify the object as a static object when an amount of time corresponding to the object's presence in the set of images is greater than a predefined threshold.

11. The computer program product of claim 10, wherein the set of images includes frames from a video.

12. The computer program product of claim 10, further comprising instructions executable by the device to cause the device to generate an alert indicating that the static object has been detected.

13. The computer program product of claim 10, further comprising:
   instructions executable by the device to cause the device to identify additional corner points for the detected object during the tracking; and
   instructions executable by the device to cause the device to update the template based, at least in part, on the identified additional corner points.

14. The computer program product of claim 10, further comprising instructions executable by the device to cause the device to utilize a tree-based representation to manage detection of the object when the object is occluded.

15. The computer program product of claim 10, further comprising:
   instructions executable by the device to cause the device to determine an amount of stability for corner points in the set of corner points, wherein the weight assigned to the corner point of the set of corner points is based, at least in part, on the corner point's respective amount of stability.

16. A computer system for static object detection, the computer system comprising:
   a processor(s) set; and
   a computer readable storage medium;
   wherein:
   the processor set is structured, located, connected and/or programmed to execute instructions stored on the computer readable storage medium; and
   the instructions include:
      instructions executable by the processor set to cause the system to detect an object that is present in at least one image of a set of images, wherein the set of images correspond to a time period;
      instructions executable by the processor set to cause the system to identify a set of corner points for the detected object;
      instructions executable by the processor set to cause the system to generate a template based on the identified set of corner points, wherein the template includes a weight assigned to a corner point of the set of corner points;
      instructions executable by the processor set to cause the system to track the object's presence in the set of images over the time period, wherein the object's presence is determined by matching the set of images to the template;
      instructions executable by processor set to cause the system to determine background information, wherein the background information includes an amount of a match between the template and a background of a first image of the set of images, and wherein the background is determined utilizing background subtraction;
      instructions executable by the processor set to cause the system to update the template based on the background information, wherein updating the template includes adjusting the weight based on the amount of the match between the background and the generated template; and
      instructions executable by the processor set to cause the system to identify the object as a static object when an amount of time corresponding to the object's presence in the set of images is greater than a predefined threshold.

17. The computer system of claim 16, wherein the set of images includes frames from a video.

18. The computer system of claim 16, further comprising instructions executable by the processor set to cause the system to generate an alert indicating that the static object has been detected.

19. The computer system of claim 16, further comprising:
   instructions executable by the processor set to cause the system to identify additional corner points for the detected object during the tracking; and
   instructions executable by the processor set to cause the system to update the template based, at least in part, on the identified additional corner points.

20. The computer system of claim 16, further comprising instructions executable by the processor set to cause the system to utilize a tree-based representation to manage detection of the object when the object is occluded.

* * * * *